United States Patent
Miyazawa

(10) Patent No.: US 8,913,749 B2
(45) Date of Patent: Dec. 16, 2014

(54) WIRELESS COMMUNICATION APPARATUS AND METHOD OF PREVENTING LEAKAGE OF ENCRYPTED KEY

(75) Inventor: Kazunori Miyazawa, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 40 days.

(21) Appl. No.: 13/546,468

(22) Filed: Jul. 11, 2012

(65) Prior Publication Data

US 2013/0016839 A1   Jan. 17, 2013

(30) Foreign Application Priority Data

Jul. 15, 2011   (JP) ................................. 2011-156622

(51) Int. Cl.
| | |
|---|---|
| *H04W 12/04* | (2009.01) |
| *H04L 29/06* | (2006.01) |
| *G06F 21/60* | (2013.01) |
| *H04L 29/08* | (2006.01) |

(52) U.S. Cl.
CPC ........... *H04W 12/04* (2013.01); *H04L 63/1441* (2013.01); *G06F 21/606* (2013.01); *G06F 2221/2143* (2013.01); *H04L 67/12* (2013.01); *G06F 2221/2105* (2013.01)
USPC .............................. 380/270; 380/277; 726/26

(58) Field of Classification Search
None
See application file for complete search history.

(56) References Cited

U.S. PATENT DOCUMENTS

| | | |
|---|---|---|
| 2004/0059919 A1 | 3/2004 | Benayoun et al. |
| 2005/0039040 A1 | 2/2005 | Ransom et al. |
| 2009/0282265 A1 | 11/2009 | Aissi et al. |

FOREIGN PATENT DOCUMENTS

| | | |
|---|---|---|
| CN | 101771699 A | 7/2010 |
| JP | 2008-541591 A | 11/2008 |
| WO | 02/056155 A2 | 7/2002 |
| WO | 2006/120302 A1 | 11/2006 |

OTHER PUBLICATIONS

European Search Report corresponding to European Patent Application No. 12176033.4, dated Nov. 15, 2012.
Ki Woong Park et al., "An Interoperable Authentication System using ZigBee-enabled Tiny Portable Device and PKI", Computer Engineering Research Lab, Department of Electrical Engineering and Computer Science, Oct. 2005, 6pgs., Korea Advanced Institute of Science and Technology.

*Primary Examiner* — Gilberto Barron, Jr.
*Assistant Examiner* — Simon Kanaan
(74) *Attorney, Agent, or Firm* — Sughrue Mion, PLLC

(57) ABSTRACT

A wireless communication apparatus may include a first module that stores a first key used to encrypt and decrypt communication contents, a second module that stores a second key used to encrypt and decrypt the first key, the first key being encrypted in accordance with a public key encryption scheme, and a connection bus that connects the first module and the second module to each other Each of the first module and the second module may include an encryption processing unit that encrypts and decrypts information, which is transmitted and received via the connection bus, by using a third key that is different from the first key and the second key.

13 Claims, 6 Drawing Sheets

WIRELESS COMMUNICATION APPARATUS AND METHOD OF PREVENTING LEAKAGE OF ENCRYPTED KEY

BACKGROUND OF THE INVENTION

1. Field of the Invention

The present invention relates to a wireless communication apparatus and a method of preventing leakage of an encrypted key.

Priority is claimed on Japanese Patent Application No. 2011-156622, filed Jul. 15, 2011, the content of which is incorporated herein by reference.

2. Description of the Related Art

Wireless communication systems have advantages in that it is not necessary to wire connection lines connecting wired communication apparatuses to each other and it is easy to install wireless communication apparatuses in places in which wiring is difficult or places in which wiring is not economical. Therefore, in recent years, wireless communication systems have frequently been utilized in various fields. For example, in plants or factories, wireless communication system are realized in such a manner that work field apparatuses such as measurement apparatuses or operation apparatuses, called wireless field apparatuses, capable of performing wireless communication are installed, and control signals used to control the wireless field apparatuses or measurement signals or the like obtained from the wireless field apparatuses are communicated via wireless communication networks.

In such a wireless communication system, various kinds of information communicated via wireless communication networks are encrypted using encryption technology such as shared key encryption schemes in many cases, since it is necessary to ensure security. In the shared key encryption schemes, it is necessary to set a shared key in the wireless communication apparatuses in advance before the wireless communication apparatuses start wireless communication, since a scheme of using the same key, which is called a shared key, is used in encrypting and decrypting processes.

For example, in many cases, manufacturers set a shared key in the wireless communication apparatuses when manufacturing the wireless communication apparatuses or users manually set a shared key in wireless communication apparatuses when starting to use the wireless communication apparatuses. A method of setting a shared key in accordance with a public key encryption scheme is also used as well as the setting method. According to the public key encryption scheme, the shared key is set by transmitting the shared key encrypted using the public key to a wireless communication apparatus and allowing the wireless communication apparatus to decrypt the shared key using a preset private key.

The method of setting a shared key by using the above-described public key encryption scheme is used in over the air (OTA) public key infrastructure (PKI) provisioning that is defined in conformity with a wireless communication standard such as ISA100.11a. ISA100.11a is an industrial automation wireless communication standard that is designed by the International Society of Automation (ISA). Further, a shared key is set according to the above-described public key encryption scheme in "An Interoperable Authentication System using ZigBee-enabled Tiny Portable Device and PKI" by Ki Woong Park et al., in Computer Engineering Research Lab., Department of Electrical Engineering and Computer Science, Korea Advanced Institute of Science and Technology.

In the wireless communication apparatus in which a shared key is set according to the above-described public key encryption scheme, a function, which is hereinafter referred to as a "public key encryption processing function", of decrypting an encrypted shared key using a public key and a function, which is hereinafter referred to as a "shared key encryption processing function", of encrypting and decrypting information to be communicated using the shared key may be mounted on a single chip. If the private key and the shared key are implemented in a single chip and access to such information is requested, the information may be prevented from being leaked to a third party in a tamper-proof configuration designed to destroy all of the information and the security may be improved.

In some cases, the public key encryption processing function and the shared key encryption processing function may not be mounted on a single chip. In these cases, for example, a module, which is hereinafter referred to as a "public key encryption processing module", on which the public key encryption processing function is mounted and a module, which is hereinafter referred to as a "wireless communication module", on which the shared key encryption processing function is mounted and which performs wireless communication are separately provided, a transceiver such as a universal asynchronous receiver transmitter (UART) is provided in each module, and a connection bus connects the modules to each other.

In this configuration, operations (1) to (3) can be performed:

(1) substituting the public key encryption processing module and the wireless communication module;

(2) changing operation modes of the public key encryption processing module and the wireless communication module; and (3) referring to communication contents transmitted via the connection bus or the like.

As described in operation (1), for example, when the wireless communication module is substituted, the shared key decrypted by the public key encryption processing module may be handed to the substituted wireless communication module. Therefore, the shared key can be referred to. Further, as described in operation (2), for example, when an operation mode of each module is changed to a "debug mode," any one of the shared key used in the wireless communication module and the private key used in the public key encryption processing module can be referred to.

Furthermore, as described in operation (3), when the communication contents are referred to via the connection bus or the like, the shared key or the private key transmitted and received between the public key encryption processing module and the wireless communication module can be referred to. Thus, when a third party who bears ill will performs one of operations (1) to (3), there is a concern that the shared key or the private key which should be kept secret may be leaked.

SUMMARY

The present invention provides a wireless communication apparatus and a method of preventing leakage of an encrypted key which should be kept secret and improve security.

A wireless communication apparatus may include: a first module that stores a first key used to encrypt and decrypt communication contents; a second module that stores a second key used to encrypt and decrypt the first key, the first key being encrypted in accordance with a public key encryption scheme; and a connection bus that connects the first module and the second module to each other. Each of the first module and the second module may include an encryption processing unit that encrypts and decrypts information, which is transmitted and received via the connection bus, by using a third key that is different from the first key and the second key. At least one of the first module and the second module may delete all the keys stored in its own module when the information, which is input via the connection bus and indicating an operation mode set in the first or second module, indicates an operation mode other than a first operation mode set in a normal operation.

Each of the first module and the second module may delete one of all the keys stored in its own module when the operation mode set in its own module is an operation mode other than the first operation mode.

The first module may include a wireless communication unit that encrypts information to be transmitted through wireless communication by using the first key, the wireless communication unit decrypting information to be received through the wireless communication by using the first key.

The second module may include a public key encryption processing unit that decrypts the first key, which is encrypted in accordance with the public key encryption scheme, by using the second key. The first key, which is decrypted by the public key encryption processing unit, may be encrypted by the encryption processing unit and is transmitted to the first module via the connection bus.

The first module may include a public key encryption processing unit that decrypts the first key, which is encrypted in accordance with the public key encryption scheme, by using the second key transmitted from the second module via the connection bus.

A wireless communication apparatus may include: an antenna; a wireless communication module; a public key encryption processing module; and a connection bus. The antenna transmits, to a backbone router, wireless waves corresponding to signals output from the wireless communication module. The antenna receives wireless waves transmitted from the backbone router to output signals to the wireless communication module. The wireless communication module may include: a wireless communication sub-module that controls a wireless communication performed via the antenna; a first bus communication sub-module that controls a bus communication performed via the connection bus; a wireless communication shared key storage region that stores a wireless communication shared key used to encrypt and decrypt communication contents of the wireless communication performed via the antenna; a first bus communication shared key storage region that stores a bus communication shared key used to encrypt and decrypt communication contents of the bus communication performed via the connection bus; and a first shared key encryption processing sub-module that encrypts and decrypts the communication contents of the wireless communication performed via the antenna by using the wireless communication shared key which is stored in the wireless communication shared key storage region, the first shared key encryption processing sub-module encrypting and decrypting the communication contents of the bus communication performed via the connection bus by using the bus communication shared key which is stored in the first bus communication shared key storage region; a first memory that stores first mode information indicating an operation mode of the wireless communication module. The public key encryption processing module may include: a second bus communication sub-module that controls the bus communication performed via the connection bus; a private key storage region that stores a private key used to decrypt a shared key which is encrypted by using a public key; a public key encryption processing sub-module that decrypts the shared key, which is received by the second bus communication sub-module, by using the private key stored in the private key storage region to obtain the wireless communication shared key; a second bus communication shared key storage region that stores the bus communication shared key; and a second shared key encryption processing sub-module that encrypts and decrypts the communication contents of the bus communication performed via the connection bus by using the bus communication shared key which is stored in the second bus communication shared key storage region; a second memory that stores second mode information indicating an operation mode of the public key encryption processing module. The wireless communication module obtains the operation mode set for the wireless communication module with reference to the first mode information stored in the first memory. The public key encryption processing module obtains the operation mode set for the public key encryption processing module with reference to the second mode information stored in the second memory. If the operation mode indicated by the first mode information stored in the first memory is an operation mode other than a secure mode, then the wireless communication module deletes the bus communication shared key stored in the first bus communication shared key storage region. If the operation mode indicated by the second mode information stored in the second memory is an operation mode other than the secure mode or the operation mode of the wireless communication module obtained via the connection bus is an operation mode other than the secure mode, then the public key encryption processing module deletes the private key stored in the private key storage region and the bus communication shared key stored in the second bus communication shared key storage region. The connection bus connects the first bus communication sub-module of the wireless communication module to the second bus communication sub-module of the public key encryption processing module.

The wireless communication sub-module may transmit and receive wireless signals in conformity with ISA 100.11a.

The bus communication sub-module may control serial communication in conformity with an asynchronous scheme.

The wireless communication shared key may be stored in the wireless communication shared key storage region when the wireless communication apparatus participates in a wireless communication network.

The bus communication shared key may be stored in the first bus communication shared key storage region when the wireless communication apparatus is manufactured.

The wireless communication shared key storage region and the first bus communication shared key storage region may be realized by non-volatile memories such as flash memories.

The first memory may be a non-volatile memory such as a flash memory.

The operation mode of the wireless communication module may include: a secure mode that is set in a normal operation of the wireless communication apparatus after shipment of the wireless communication apparatus; and a debug mode that is set to inspect and analyze an operation state of the wireless communication module when the wireless communication apparatus is maintained.

The second bus communication sub-module may control serial communication in conformity with an asynchronous scheme.

The private key may be stored in the private key storage region and the bus communication shared key may be stored in the second bus communication shared key storage region when the wireless communication apparatus is manufactured.

The private key storage region and the second bus communication shared key storage region may be realized by non-volatile memories such as flash memories.

The second memory may be a non-volatile memory such as a flash memory.

The operation mode of the public key encryption processing module may include the secure mode and the debug mode. The operation modes of the wireless communication module and the public key encryption processing module can be individually changed when a worker gives an instruction to the wireless communication module and the public key encryption processing module.

A method of preventing leakage of an encrypted key in a wireless communication apparatus may include a first module that stores a first key used to encrypt and decrypt communication contents, a second module that stores a second key used to decrypt the first key encrypted in accordance with a public key encryption scheme, and a connection bus that connects the first and second modules to each other. The method may include: encrypting information indicating an operation mode set in the first or second module by using a third key different from the first and second keys and transmitting the encrypted information from at least one of the first and second modules to the connection bus; decrypting the information transmitted via the connection bus by using the third key by at least one of the first and second modules; and deleting the key stored in its own module when the information decrypted in the second step indicates an operation mode other than the first operation mode set in a normal operation.

Each of the first module and the second module may delete all the keys stored in its own module when the operation mode set in its own module is an operation mode other than the first operation mode.

The method of preventing leakage of an encrypted key in a wireless communication apparatus may further include: encrypting information to be transmitted through wireless communication by using the first key in the first module; and decrypting information to be received through the wireless communication by using the first key in the first module.

According to an aspect of the present invention, when information, which indicates an operation mode set in first and second modules, is encrypted using a third key, and is transmitted via a connection bus, indicates an operation mode other than a first operation mode set in a normal operation, at least one of the first and second modules deletes the key set in its own module. Accordingly, even when the first or second module is substituted and the operation mode of the first or second module is changed or communication contents transmitted via the connection bus are referred to, the key which should be kept secret can be prevented from being leaked, and thus security can be improved.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

First Preferred Embodiment

Figure 1:
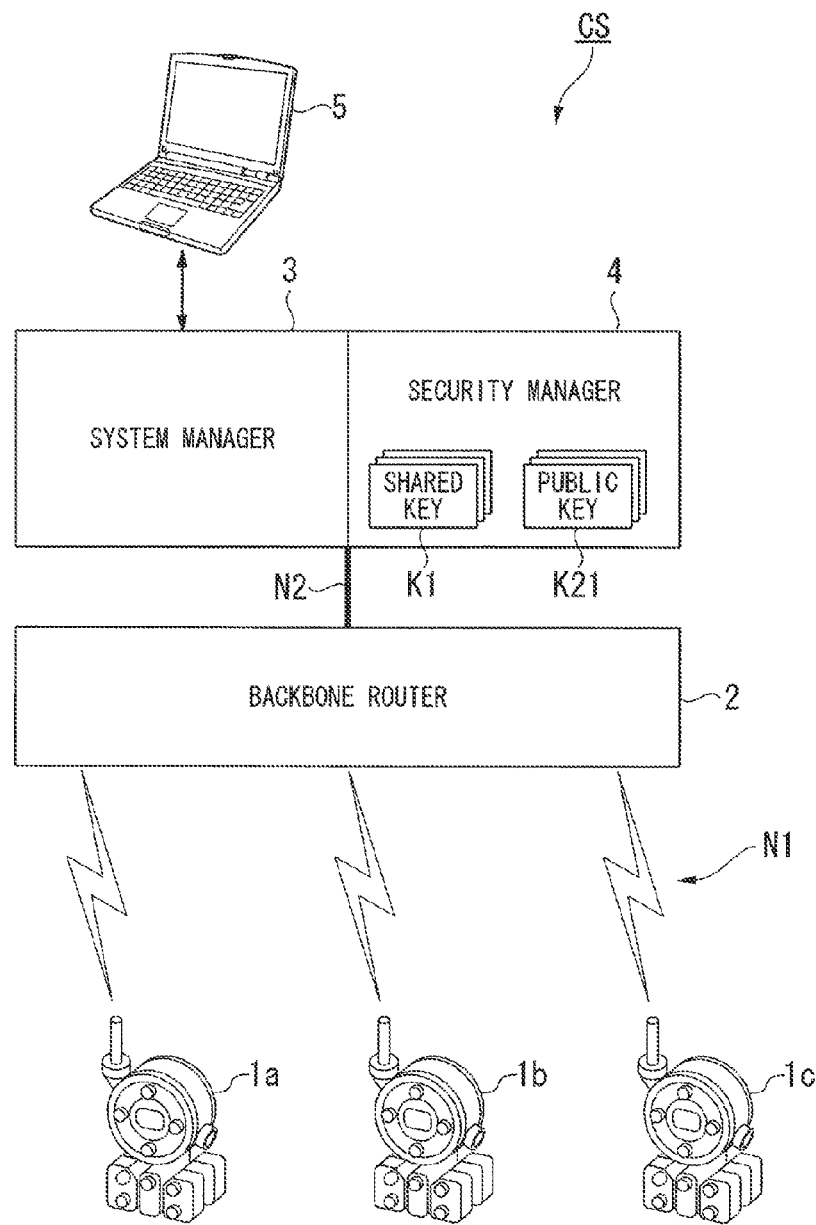
FIG. 1 is a block diagram illustrating an overall configuration of a wireless communication system in which wireless communication apparatuses in accordance with a first preferred embodiment of the present invention are used.

FIG. 1 is a block diagram illustrating the overall configuration of a wireless communication system in which wireless communication apparatuses in accordance with a first preferred embodiment of the present invention are used. As shown in FIG. 1, a wireless communication system CS includes wireless field apparatuses 1a, to 1c, a backbone router 2, a system manager 3, a security manager 4, and a high-level management apparatus 5. The wireless field apparatuses 1a, to 1c, correspond to wireless communication apparatuses.

The wireless field apparatuses 1a, to 1c, and the system manager 3 can communicate various kinds of information via the backbone router 2. The three wireless field apparatuses 1a, to 1c, are illustrated in FIG. 1, but any number of wireless field apparatuses may be provided.

The wireless field apparatuses 1a, to 1c, are, for example, sensor apparatuses such as flow meters or temperature sensors, valve apparatuses such as flow control valves or on-off valves, or actuator apparatuses such as fans or motors, which are installed in plants or factories. The wireless field apparatuses 1a, to 1c, perform wireless communication in conformity with ISA100.11a which is an industrial automation wireless communication standard. The wireless field apparatuses 1a, to 1c, will be described in detail later.

The backbone router 2 connects a wireless communication network N1, to which the wireless field apparatuses 1a, to 1c, are connected, to a backbone network N2 which is a wired network and to which the system manager 3 is connected. The backbone router 2 is an apparatus that relays various kinds of data transmitted and received between the wireless field apparatuses 1a, to 1c, and the system manager 3. The backbone router 2 also performs wireless communication in conformity with ISA100.11a which is the above-described wireless communication standard.

The system manager 3 performs communication with the wireless field apparatuses 1a, to 1c, via the wireless communication network N1 formed by the backbone router 2 and also manages the wireless field apparatuses 1a, to 1c, connected to the wireless communication network N1. Specifically, the system manager 3 controls the communication with the wireless field apparatuses 1a, to 1c, participating in the wireless communication network N1.

Further, the system manager 3 performs management control to determine whether to permit a new wireless field apparatus to participate in the wireless communication network N1. When the system manager 3 performs this management control, the system manager 3 performs a process of transmitting, to a wireless field apparatus, a shared key K1 (specifically, a shared key K1 encrypted using a public key K21) used to encrypt communication contents of wireless communication performed via the wireless communication network N1. The shared key K1 and the public key K21 are managed by the security manager 4.

The security manager 4 performs security management of the wireless communication system CS under the control of the system manager 3. Specifically, the security manager 4 performs registry management of information indicating the wireless field apparatuses 1a, to 1c, permitted to participate in the wireless communication network N1 or information indicating the wireless field apparatuses not permitted to participate in the wireless communication network N1. The security manager 4 also performs management of the shared key K1 which is an encrypted key used for wireless communication between the wireless field apparatuses 1a, to 1c, and the backbone router 2 and the public key K21 which is an encrypted key used to encrypt the shared key K1. The shared key K1 and the public key K21 are prepared for each of the wireless field apparatuses 1a, to 1c.

The high-level management apparatus 5 is an apparatus that is connected to the system manager 3, is operated by an administrator of the wireless communication system CS, and is used to manage the wireless communication system CS. The high-level management apparatus 5 collects various kinds of information necessary to manage the wireless communication system CS from the system manger 3 in response to an instruction of the administrator and displays the collected information in a predetermined format such as a graph format by which the administrator can easily understand the information.

Figure 2:
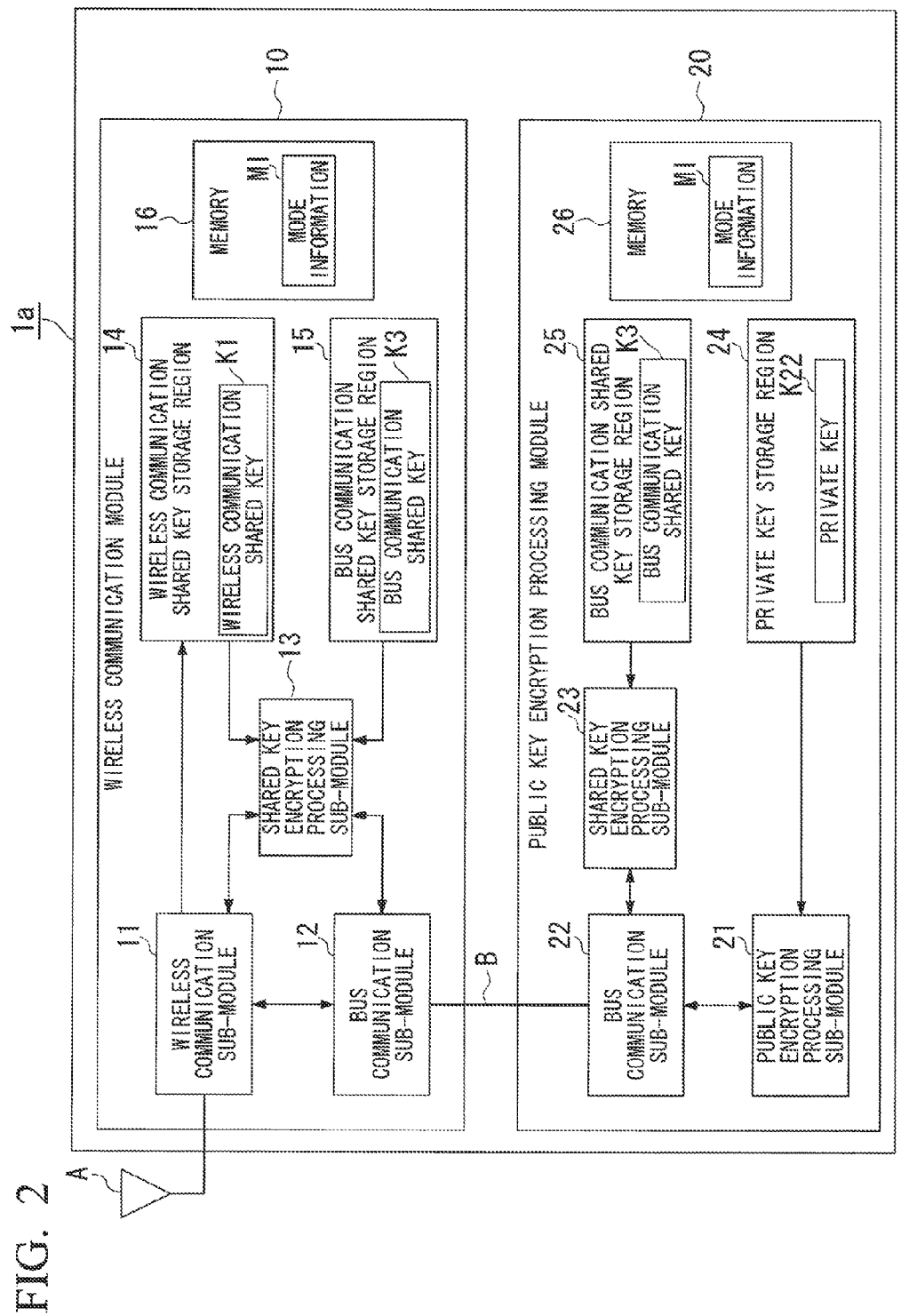
FIG. 2 is a block diagram illustrating configurations of main units of a wireless field apparatus which is the wireless communication apparatus in accordance with the first preferred embodiment of the present invention.

Next, the wireless field apparatuses 1a, to 1c, used in the above-described wireless communication system CS will be described in detail. FIG. 2 is a block diagram illustrating the configurations of the main units of the wireless field apparatus which is a wireless communication apparatus in accordance with the first preferred embodiment of the present invention. Since the wireless field apparatuses 1a, to 1c, have the same configuration, only the wireless field apparatus 1a, will be described in detail below and the wireless field apparatuses 1b, and 1c, will not be described.

As shown in FIG. 2, the wireless field apparatus 1a, includes an antenna A, a wireless communication module 10, a public key encryption processing module 20, and a connection bus B. The wireless communication module 10 corresponds to a first module. The public key encryption processing module 20 corresponds to a second module.

The antenna A transmits, to the backbone router 2, wireless waves corresponding to signals output from the wireless communication module 10. The antenna A also receives wireless waves transmitted from the backbone router 2 and outputs the signals to the wireless communication module 10.

The wireless communication module 10 includes a wireless communication sub-module 11, a bus communication sub-module 12, a shared key encryption processing sub-module 13, a wireless communication shared key storage region 14, a bus communication shared key storage region 15, and a memory 16. The wireless communication sub-module 11 corresponds to a wireless communication unit. The shared key encryption processing sub-module 13 corresponds to an encryption processing unit.

The wireless communication module 10 controls the wireless communication performed via the antenna A and also controls bus communication performed via the connection bus B. The wireless communication module 10 encrypts and decrypts communication contents of the wireless communication performed via the antenna A and communication contents of the bus communication performed via the connection bus B.

The wireless communication sub-module 11 is a sub-module that controls the wireless communication performed via the antenna A. The wireless communication sub-module 11 transmits and receives wireless signals in conformity with ISA 100.11a which is the above-described wireless communication standard. The bus communication sub-module 12 is a sub-module that controls the communication, which is referred to as a bus communication, performed via the connection bus B. For example, the bus communication sub-module 12 controls serial communication in conformity with an asynchronous scheme.

The shared key encryption processing sub-module 13 encrypts and decrypts the communication contents of the wireless communication performed via the antenna A using a shared key, which corresponds to a wireless communication shared key K1, stored in the wireless communication shared key storage region 14. The shared key encryption processing sub-module 13 also encrypts and decrypts the communication contents of the bus communication performed via the connection bus B using a shared key, which corresponds to a bus communication shared key K3, stored in the bus communication shared key storage region 15.

The wireless communication shared key storage region 14 is a region in which the wireless communication shared key K1 used to encrypt and decrypt the communication contents of the wireless communication performed via the antenna A is stored. The wireless communication shared key K1 is the same as the shared key K1 managed by the security manager 4. The wireless communication shared key K1 is stored in the wireless communication shared key storage region 14 when the wireless field apparatus 1a, participates in the wireless communication network N1.

The bus communication shared key storage region 15 is a region in which the bus communication shared key K3 used to encrypt and decrypt the communication contents of the bus communication performed via the connection bus B is stored. The bus communication shared key K3 is stored in the bus communication shared key storage region 15, for example, when the wireless field apparatus 1a, is manufactured. The wireless communication shared key storage region 14 and the bus communication shared key storage region 15 are realized by, for example, non-volatile memories such as flash memories.

The memory 16 is a non-volatile memory such as a flash memory. The memory 16 stores information, which corresponds to mode information MI, indicating an operation mode of the wireless communication module 10. Examples of the operation mode of the wireless communication module 10 include a secure mode and a debug mode. The secure mode corresponds to a first mode.

Here, the secure mode is an operation mode that is set in a normal operation of the wireless field apparatus 1a, after shipment of the wireless field apparatus 1a. The debug mode is an operation mode that is set to inspect or analyze an operation state of the wireless communication module 10, for example, when the wireless field apparatus 1a, is maintained.

The public key encryption processing module 20 includes a public key encryption processing sub-module 21, a bus communication sub-module 22, a shared key encryption processing sub-module 23, a private key storage region 24, a bus communication shared key storage region 25, and a memory 26. The public key encryption processing sub-module 21 corresponds to a public key encryption processing unit. The shared key encryption processing sub-module 23 corresponds to an encryption processing unit.

The public key encryption processing module 20 decrypts the shared key K1 encrypted using the public key and also controls the bus communication performed via the connection bus B. The public key encryption processing module 20 encrypts and decrypts the communication contents of the bus communication performed via the connection bus B.

The public key encryption processing sub-module 21 decrypts the shared key K1 received by the bus communication sub-module 22 using a private key K22 stored in the private key storage region 24 to obtain the wireless communication shared key K1. The bus communication sub-module 22 is a sub-module that controls the communication performed via the connection bus B, as in the bus communication sub-module 12 of the wireless communication module 10. For example, the bus communication sub-module 22 controls serial communication in conformity with an asynchronous scheme.

The shared key encryption processing sub-module 23 encrypts and decrypts the communication contents of the bus communication performed via the connection bus B using a shared key, which corresponds to a bus communication shared key K3, stored in the bus communication shared key storage region 25. The bus communication shared key K3 stored in the bus communication shared key storage region 25 of the public key encryption processing module 20 is the same as the bus communication shared key K3 stored in the bus communication shared key storage region 15 of the wireless communication module 10.

The private key storage region 24 is a region in which the private key K22 used to decrypt the shared key K1 encrypted using the public key K21 is stored. The bus communication shared key storage region 25 is a region in which the bus communication shared key K3 used to encrypt and decrypt the communication contents of the bus communication performed via the connection bus B is stored. The private key K22 and the bus communication shared key K3 are stored in the private key storage region 24 and the bus communication shared key storage region 25, respectively, for example, when the wireless field apparatus 1a, is manufactured. The private key storage region 24 and the bus communication shared key storage region 25 are realized by, for example, non-volatile memories such as flash memories.

The memory 26 is a non-volatile memory such as a flash memory. The memory 26 stores information, which corresponds to mode information MI, indicating an operation mode of the public key encryption processing module 20. Examples of the operation mode of the public key encryption processing module 20 include a secure mode and a debug mode, as in the operation modes of the wireless communication module 10. The secure mode corresponds to a first mode.

The wireless communication module 10 obtains an operation mode set for its own module with reference to the mode information MI stored in the memory 16. Likewise, the public key encryption processing module 20 obtains an operation mode set for its own module with reference to the mode information MI stored in the memory 26. However, the operation modes of the wireless communication module 10 and the public key encryption processing module 20 can be individually changed when a worker gives a special instruction to the wireless communication module 10 and the public key encryption processing module 20.

The wireless communication module 10 and the public key encryption processing module 20 delete the private key K22 or the bus communication shared key K3 in accordance with the operation mode set for its own module or the operation mode set for the other party module connected via the connection bus B when power is supplied. The reason for deleting the private key K22 or the bus communication shared key K3 is to prevent leakage of the key which should be kept secret and improve security.

Specifically, the wireless communication module 10 deletes the bus communication shared key K3 stored in the bus communication shared key storage region 15 when the operation mode indicated by the mode information MI stored in the memory 16 is an operation mode other than the secure mode. The public key encryption processing module 20 deletes the private key K22 stored in the private key storage region 24 and the bus communication shared key K3 stored in the bus communication shared key storage region 25 when the operation mode indicated by the mode information MI stored in the memory 26 is an operation mode other than the secure mode or the operation mode of the wireless communication module 10 obtained via the connection bus B is an operation mode other than the secure mode.

The connection bus B is a bus such as a serial bus connecting the bus communication sub-module 12 of the wireless communication module 10 to the bus communication sub-module 22 of the public key encryption processing module 20. The connection bus B is not limited to a serial bus, but may be a parallel bus.

Next, operations of the wireless communication system with the above-described configuration will be described. Hereinafter, the operations of the wireless communication system will be described when the wireless field apparatus 1a newly participates in the wireless communication network N1 of the wireless communication system CS. When the wireless field apparatus 1a, participates in the wireless communication network N1, it is assumed that the shared key K1 used to encrypt the communication contents of the wireless communication performed by the wireless field apparatus 1a, and the public key K21 used to encrypt the shared key K1 are registered in advance in the security manager 4.

Further, it is assumed that the private key K22 corresponding to the public key K21 registered in the security manager 4 is stored in the private key storage region 24 of the public key encryption processing module 20 of the wireless field apparatus 1a, and the bus communication shared key K3 is stored in the bus communication shared key storage region 15 of the wireless communication module 10 and the bus communication shared key storage region 25 of the public key encryption processing module 20. Furthermore, it should be noted that the wireless communication shared key K1 is not stored in the wireless communication shared key storage region 14 of the wireless communication module 10 before the wireless field apparatus 1a, participates in the wireless communication network N1.

Figure 3:
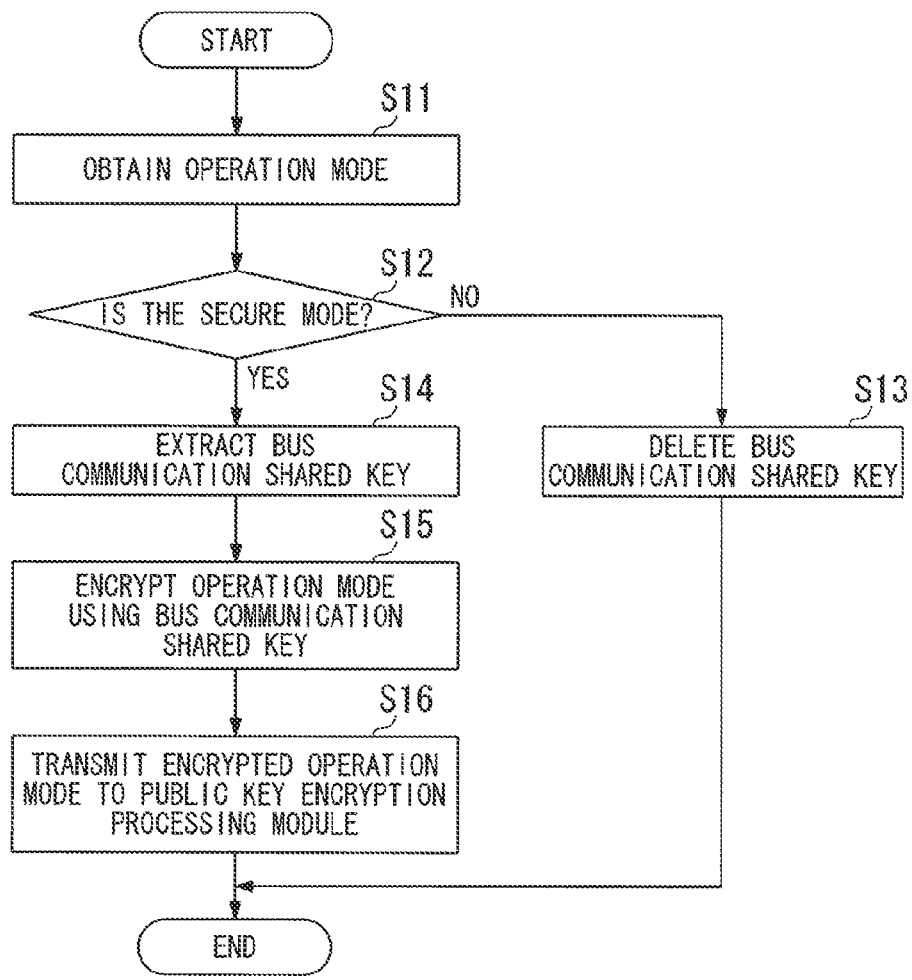
FIG. 3 is a flowchart illustrating processes performed by a wireless communication module of the wireless field apparatus in accordance with the first preferred embodiment of the present invention when power is supplied.
Figure 4:
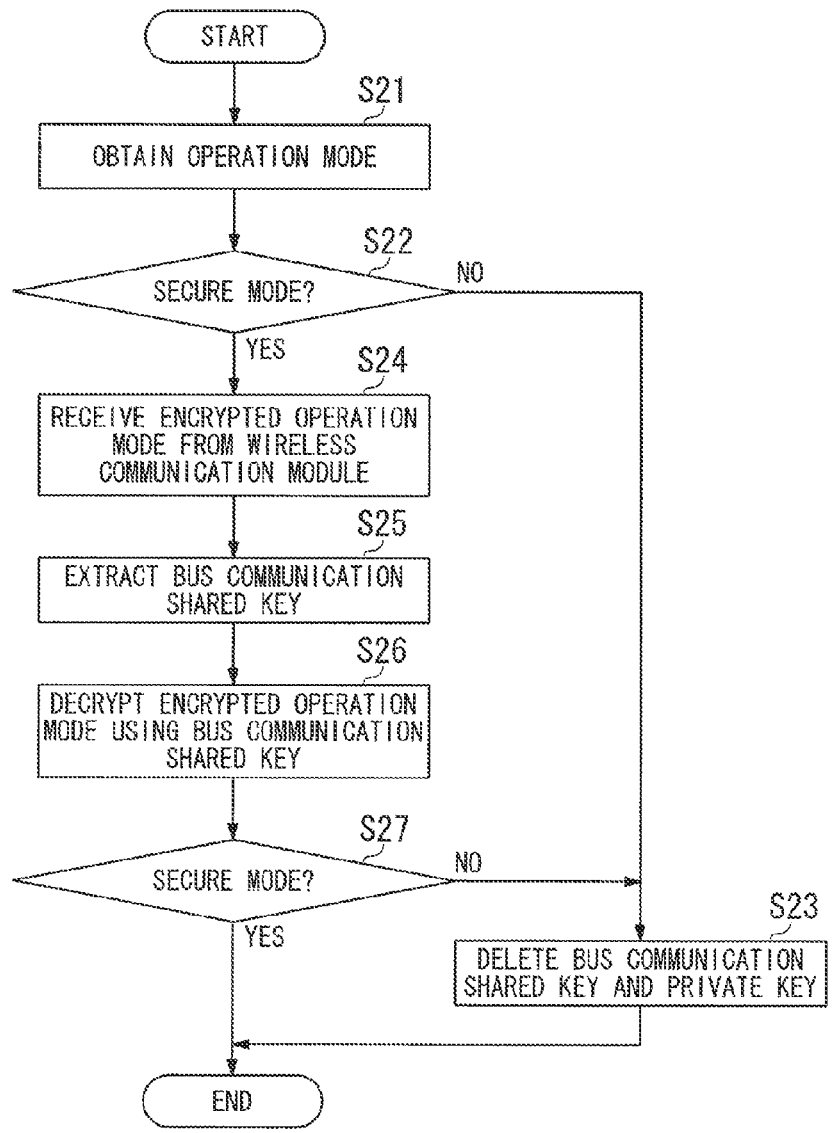
FIG. 4 is a flowchart illustrating processes performed by a public key encryption processing module of the wireless field apparatus in accordance with the first preferred embodiment of the present invention when power is supplied.

FIG. 3 is a flowchart illustrating processes performed by the wireless communication module of the wireless field apparatus in accordance with the first preferred embodiment of the present invention when power is supplied. FIG. 4 is a flowchart illustrating processes performed by the public key encryption processing module of the wireless field apparatus in accordance with the first preferred embodiment of the present invention when power is supplied. The processes of the flowcharts of FIGS. 3 and 4 start, for example, when a worker installs the wireless field apparatus 1a, in a work field and power is supplied to the wireless field apparatus 1a, after the completion of the installation work.

When power is supplied to the wireless field apparatus 1a, in step S11 shown in FIG. 3, the wireless communication module 10 first obtains the operation mode set for its own module. Specifically, the wireless communication module 10 reads the mode information MI stored in the memory 16. Next, in step S12, the wireless communication module 10 determines whether or not the operation mode indicated by the mode information MI read from the memory 16 is the secure mode.

If the wireless communication module 10 determines that the operation mode indicated by the mode information MI is not the secure mode, that is, when the determination result of step S12 is "NO", then, in step S13, the wireless communication module 10 deletes the bus communication shared key K3 stored in the bus communication shared key storage region 15. When the bus communication shared key K3 stored in the bus communication shared key storage region 15 is deleted, the series of processes shown in FIG. 3 ends. Thus, the wireless field apparatus 1a, does not operate normally.

Conversely, if the wireless communication module 10 determines that the operation mode indicated by the mode information MI is the secure mode, that is, when the determination result of step S12 is "YES", then, in step S14, the shared key encryption processing sub-module 13 extracts the bus communication shared key K3 stored in the bus communication shared key storage region 15, and then, in step S15, encrypts the mode information MI obtained in step S11 using the extracted bus communication shared key K3.

If the above-described processes end, then, in step S16, the bus communication sub-module 12 transmits the encrypted mode information MI to the public key encryption processing module 20 via the connection bus B. Step S16 corresponds to a first step. Then, the series of processes shown in FIG. 3 ends. When the process of step S16 is performed, the bus communication shared key K3 stored in the bus communication shared key storage region 15 is not deleted. Therefore, the process of permitting the wireless field apparatus to participate in the wireless communication network N1 continues.

If power is supplied to the wireless field apparatus 1a, then, in step S21 shown in FIG. 4, the public key encryption processing module 20 also obtains the operation mode set for its own module, as in the wireless communication module 10. Specifically, the public key encryption processing module 20 reads the mode information MI stored in the memory 26. Then, in step S22, the public key encryption processing module 20 determines whether or not the obtained operation mode is the secure mode.

If the public key encryption processing module 20 determines that the obtained operation mode is not the secure mode, that is, when the determination result of step S22 is "NO", then, in step S23, the public key encryption processing module 20 deletes the private key K22 stored in the private key storage region 24 and also deletes the bus communication shared key K3 stored in the bus communication shared key storage region 25. When the public key encryption processing module 20 deletes the private key K22 and the bus communication shared key K3, the series of processes shown in FIG. 4 ends. Thus, the wireless field apparatus 1a, does not operate normally.

Conversely, if the public key encryption processing module 20 determines that the obtained operation mode is the secure mode, that is, when the determination result of step S22 is "YES", then, in step S24, the bus communication sub-module 22 receives the encrypted mode information MI transmitted from the wireless communication module 10 via the connection bus B. When the bus communication sub-module 22 is not able to receive the encrypted mode information MI transmitted from the wireless communication module 10 though the power is supplied to the wireless field apparatus 1a, and a preset time passes, the series of operations shown in FIG. 4 ends.

If the bus communication sub-module 22 receives the encrypted mode information MI, then, in step S25, the shared key encryption processing sub-module 23 extracts the bus communication shared key K3 stored in the bus communication shared key storage region 25, and then, in step S26, decrypts the encrypted mode information MI encrypted using the extracted bus communication shared key K3. Step S26 corresponds to a second step. Then, in step S27, the public key encryption processing module 20 determines whether or not the operation mode indicated by the decrypted mode information MI is the secure mode.

If the public key encryption processing module 20 determines that the operation mode indicated by the decrypted mode information MI is not the secure mode, that is, when the determination result of step S27 is "NO", then, in step S23, the public key encryption processing module 20 deletes the private key K22 stored in the private key storage region 24 and deletes the bus communication shared key K3 stored in the bus communication shared key storage region 25. Step S23 corresponds to a third step. Thus, the series of processes shown in FIG. 4 ends, and the wireless field apparatus 1a does not operate normally.

Conversely, if the public key encryption processing module 20 determines that the operation mode indicated by the decrypted mode information MI is the secure mode, that is, when the determination result of step S27 is "YES", then the series of processes shown in FIG. 4 ends. Further, if the determination result of step S27 is "YES," then the private key K22 stored in the private key storage region 24 and the bus communication shared key K3 stored in the bus communication shared key storage region 25 are not deleted. Therefore, the process of permitting the wireless field apparatus to participate in the wireless communication network N1 continues.

When the operation mode set for its own wireless communication module 10 is an operation mode other than the secure mode, the wireless communication module 10 deletes the bus communication shared key K3 stored in the bus communication shared key storage region 15. Further, when the operation mode set for its own public key encryption processing module 20 or the wireless communication module 10 is an operation mode other than the secure mode, the public key encryption processing module 20 deletes both the private key K22 stored in the private key storage region 24 and the bus communication shared key K3 stored in the bus communication shared key storage region 25.

Therefore, even when the wireless communication module 10 or the public key encryption processing module 20 is substituted or the operation mode of the wireless communication module 10 or the public key encryption processing module 20 is changed, the private key K22 and the bus communication shared key K3 can be prevented from leaking. Further, the communication contents transmitted via the connection bus B are encrypted. Therefore, the private key K22 and the bus communication shared key K3 are not leaked even when the communication contents transmitted via the connection bus B are referred to.

If the above-described processes end, then the wireless communication starts between the wireless field apparatus 1a, and the backbone router 2, and thus a joining request, which is a request to participate in the wireless communication network N1, is transmitted from the wireless field apparatus 1a, to the system manager 3. When the system manager 3 receives the joining request from the wireless field apparatus 1a, the system manager 3 transmits information indicating joining permission or information indicating joining rejection to the wireless field apparatus 1a, with reference to information registered in the security manager 4.

Figure 5:
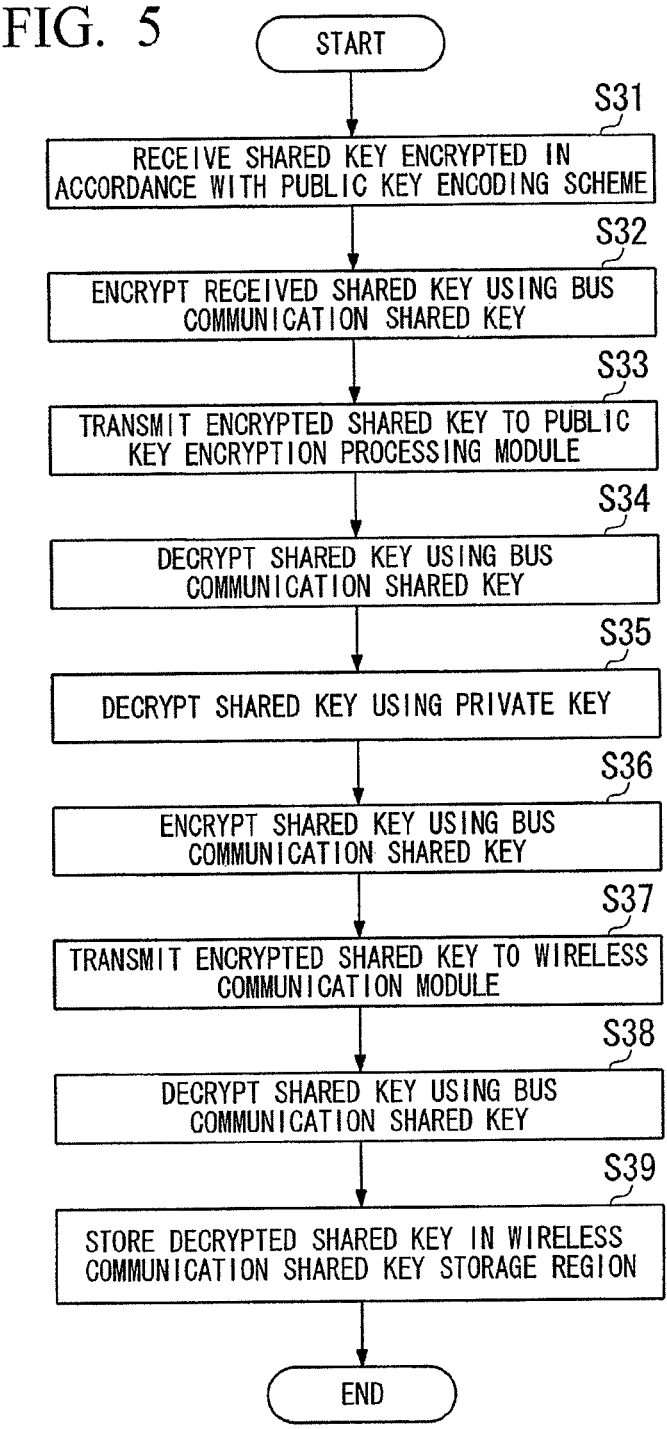
FIG. 5 is a flowchart illustrating a process of setting a wireless communication shared key on the wireless field apparatus in accordance with the first preferred embodiment of the present invention.

When the system manager 3 transmits the information indicating the joining permission to the wireless field apparatus 1a, a process of setting the wireless communication shared key K1 in the wireless field apparatus 1a, is performed to encrypt information transmitted to and received from the wireless field apparatus 1a. FIG. 5 is a flowchart illustrating the process of setting the wireless communication shared key on a wireless field apparatus in accordance with the first preferred embodiment of the present invention.

First, the shared key K1 and the public key K21 registered in its own security manager 4 are extracted in response to a request from the system manager 3, and then the security manager 4 encrypts the shared key K1 using the public key K21 and returns the result to the system manager 3. Hereinafter, the shared key K1 encrypted using the public key K21 is referred to as a "primary encrypted key." In step S31, the primary encrypted key is received by the wireless communication sub-module 11 of the wireless communication module 10 of the wireless field apparatus 1a sequentially via the backbone network N2, the backbone router 2, and the wireless communication network N1.

In step S32, the shared key encryption processing sub-module 13 further encrypts the primary encrypted key received by the wireless communication sub-module 11 using the bus communication shared key K3. Hereinafter, the primary encrypted key encrypted using the bus communication shared key K3 is referred to as a "secondary encrypted key." In step S33, the bus communication sub-module 12 transmits the secondary encrypted key to the public key encryption processing module 20 via the connection bus B.

If the bus communication sub-module 22 of the public key encryption processing module 20 receives the secondary encrypted key transmitted via the connection bus B, then, in step S34, the shared key encryption processing sub-module 23 decrypts the secondary encrypted key using the bus communication shared key K3 to obtain the primary encrypted key. Then, in step S35, the public key encryption processing sub-module 21 further decrypts the decrypted primary encrypted key using the private key K22 to obtain the shared key K1.

Next, in step S36, the shared key encryption processing sub-module 23 encrypts the decrypted shared key K1 using the bus communication shared key K3. In step S37, the bus communication sub-module 22 transmits the encrypted shared key K1 to the wireless communication module 10 via the connection bus B.

If the bus communication sub-module 12 of the wireless communication module 10 receives the encrypted shared key K1 via the connection bus B, then, in step S38, the shared key encryption processing sub-module 13 decrypts the encrypted shared key K1 using the bus communication shared key K3 to obtain the shared key K1. Then, in step S39, the decrypted shard key K1 is stored as the wireless communication shared key K1 in the wireless communication shared key storage region 14.

When the above-described processes end, the shared key encryption processing sub-module 13 performs a process of encrypting information transmitted from the wireless field apparatus 1a, using the wireless communication shared key K1 or a shared key generated based on the wireless communication shared key K1 in accordance with a specific algorithm and also performs a process of decrypting the information received by the wireless field apparatus 1a, using the wireless communication shared key K1. Thus, it is possible to ensure the security of the wireless communication performed with the wireless field apparatus 1a.

When the communication contents are encrypted using the bus communication shared key K3, the wireless communication module 10 and the public key encryption processing module 20 perform the communication via the connection bus B. Thus, the shared key K1 transmitted and received between the wireless communication module 10 and the public key encryption processing module 20 is not leaked even when the communication contents transmitted via the connection bus B are referred to.

Second Preferred Embodiment

Figure 6:
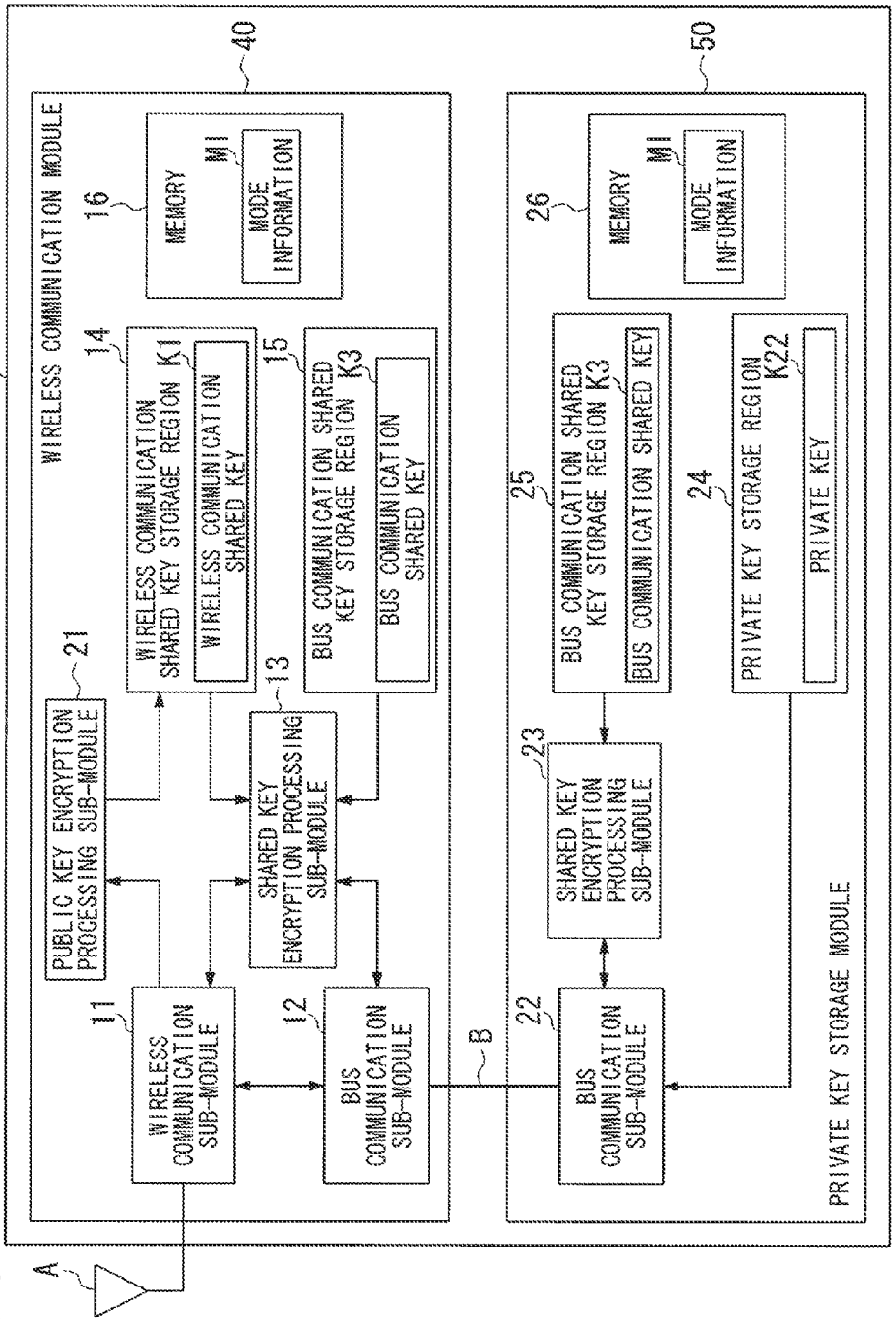
FIG. 6 is a block diagram illustrating the configurations of the main units of the wireless field apparatus which is the wireless communication apparatus in accordance with a second preferred embodiment of the present invention.

FIG. 6 is a block diagram illustrating the configurations of the main units of a wireless field apparatus which is a wireless communication apparatus in accordance with a second preferred embodiment of the present invention. In FIG. 6, the same reference numerals are given to the same blocks as those shown in FIG. 2. The overall configuration of a wireless communication system CS in accordance with the second preferred embodiment is the same as the configuration shown in FIG. 1. Hereinafter, a wireless field apparatus 1a, will be described in detail and wireless field apparatuses 1b and 1c, will not be described.

In the wireless field apparatus 1a, shown in FIG. 6, the wireless communication module 10 and the public key encryption processing module 20 shown in FIG. 2 are substituted with a wireless communication module 40 and a private key storage module 50, respectively. The wireless communication module 40 decrypts a shared key K1 encrypted using a private key K22. That is, the wireless communication module 40 has some of the functions of the public key encryption processing module 20 of the wireless field apparatus 1a, shown in FIG. 2.

Specifically, the wireless communication module 40 has a configuration in which the public key encryption processing sub-module 21 of the public key encryption processing module 20 shown in FIG. 2 is added to the wireless communication module 10 shown in FIG. 2. On the other hand, the private key storage module 50 has a configuration in which the public key encryption processing sub-module 21 of the public key encryption processing module 20 shown in FIG. 2 is not provided. The wireless communication module 40 performs the same process as the wireless communication module 10 shown in FIG. 3 when power is supplied. The private key storage module 50 performs the same process as the public key encryption processing module 20 shown in FIG. 4 when power is supplied.

In the wireless field apparatus 1a, having the above-described configuration, the private key K22 stored in a private key storage region 24 of the private key storage module 50 is encrypted using a bus communication shared key K3, and then is transmitted to the wireless communication module 40 via the connection bus B. Then, the wireless communication module 40 decrypts the private key K22 transmitted from the private key storage module 50 using the bus communication shared key K3 and transmits the decrypted private key K22 to the public key encryption processing sub-module 21. Then, a wireless communication sub-module 11 decrypts the received primary encrypted key.

In the second preferred embodiment, the wireless communication module 40 and the private key storage module 50 each perform the processes shown in FIGS. 3 and 4. Even when the wireless communication module 40 or the private key storage module 50 is substituted or an operation mode of the wireless communication module 40 or the private key storage module 50 is changed, the private key K22 and the bus communication shared key K3 can be prevented from leaking. Further, communication contents transmitted via the connection bus B are encrypted. Therefore, even when the communication contents transmitted via the connection bus B are referred to, the private key K22 and the bus communication shared key K3 are prevented from leaking.

The wireless communication apparatus and the method of preventing the leakage of the encrypted key in accordance with the preferred embodiments have been described. The present invention is not limited to the above-described preferred embodiments, but may be modified in various ways within the scope of the present invention. For example, in the above-described preferred embodiments, the example in which the public key encryption processing module 20 deletes the private key K22 and the bus communication shared key K3 in accordance with an operation mode of the wireless communication module 10 has been described. However, the wireless communication module 10 may delete the bus communication shared key K3 in accordance with an operation mode of the public key encryption processing module 20. Further, both the wireless communication module 10 and the public key encryption processing module 20 may delete the encrypted key in accordance with an operation mode set in the other party module.

In the above-described preferred embodiments, the example in which the bus communication shared key K3 stored in each of the wireless communication module 10 and the public key encryption processing module 20 is used when the wireless field apparatus 1a, is manufactured has been described. However, the bus communication shared key K3 generated dynamically based on a time at which the power is supplied to the wireless field apparatus 1a, or the like may be used. Such a generation algorithm is preferably deleted when impropriety is detected as in the bus communication shared key K3.

The wireless communication module 10 and the public key encryption processing module 20 preferably have a tamper-proof configuration against a physical attack such as peeping from the outside. For example, when the public key encryption processing module 20 causes a considerable change in power consumption in a process of decrypting the public key K21, a function of making the power consumption uniform is preferably provided so as not to cause a change in the power consumption. Further, in order to reduce the power consumption, the power supplied to the public key encryption processing module 20 is preferably controlled so that power is supplied to the public key encryption processing module 20, only as necessary.

In the above-described preferred embodiments, the example in which the public key K21 is registered in advance in the security manager 4 has been described. However, the public key K21 may be stored together with the private key K22 in the wireless field apparatus 1a, and the security manager 4 may obtain the public key K21 from the wireless field apparatus 1a, via the system manager 3 when the shared key K1 is set in the wireless field apparatus 1a. Further, in the above-described preferred embodiments, the example in which the wireless communication apparatuses are wireless field apparatuses has been described. However, the present invention is also applicable to wireless communication apparatuses other than the wireless field apparatuses.

As used herein, the following directional terms "forward, rearward, above, downward, right, left, vertical, horizontal, below, transverse, row and column" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A wireless communication apparatus comprising: an antenna; a wireless communication module; a public key encryption processing module; and a connection bus, wherein
the antenna transmits, to a communication device, wireless waves corresponding to signals output from the wireless communication module, the antenna receives wireless waves transmitted from the communication device to output signals to the wireless communication module,
the wireless communication module comprising:
a wireless communication sub-module that controls a wireless communication performed via the antenna;
a first bus communication sub-module that controls a bus communication performed via the connection bus;
a wireless communication shared key storage region that stores a wireless communication shared key used to encrypt and decrypt communication contents of the wireless communication performed via the antenna;
a first bus communication shared key storage region that stores a bus communication shared key used to encrypt and decrypt communication contents of the bus communication performed via the connection bus; and
a first shared key encryption processing sub-module that encrypts and decrypts the communication contents of the wireless communication performed via the antenna by using the wireless communication shared key which is stored in the wireless communication shared key storage region, the first shared key encryption processing sub-module encrypting and decrypting the communication contents of the bus communication performed via the connection bus by using the bus communication shared key which is stored in the first bus communication shared key storage region;
a first memory that stores first mode information indicating an operation mode of the wireless communication module, the public key encryption processing module comprising:
  a second bus communication sub-module that controls the bus communication performed via the connection bus;
  a private key storage region that stores a private key used to decrypt a shared key which is encrypted by using a public key;
  a public key encryption processing sub-module that decrypts the shared key, which is received by the second bus communication sub-module, by using the private key stored in the private key storage region to obtain the wireless communication shared key;
  a second bus communication shared key storage region that stores the bus communication shared key; and
  a second shared key encryption processing sub-module that encrypts and decrypts the communication contents of the bus communication performed via the connection bus by using the bus communication shared key which is stored in the second bus communication shared key storage region;
  a second memory that stores second mode information indicating an operation mode of the public key encryption processing module,
  the wireless communication module obtains the operation mode set for the wireless communication module with reference to the first mode information stored in the first memory,
  the public key encryption processing module obtains the operation mode set for the public key encryption processing module with reference to the second mode information stored in the second memory,
  if the operation mode indicated by the first information stored in the first memory is an operation mode other than a secure mode, then the wireless communication module deletes the bus communication shared key stored in the first bus communication shared key storage region,
  if the operation mode indicated by the second mode information stored in the second memory is an operation mode other than the secure mode or the operation mode of the wireless communication module obtained via the connection bus is an operation mode other than the secure mode, then the public key encryption processing module deletes the private key stored in the private key storage region and the bus communication shared key stored in the second bus communication shared key storage region, and
  the connection bus connects the first bus communication sub-module of the wireless communication module to the second bus communication sub-module of the public key encryption processing module.

2. The wireless communication apparatus according to claim 1, wherein the wireless communication sub-module transmits and receives wireless signals in conformity with ISA 100.11a.

3. The wireless communication apparatus according to claim 1, wherein the bus communication sub-module controls serial communication in conformity with an asynchronous scheme.

4. The wireless communication apparatus according to claim 1, wherein the wireless communication shared key is stored in the wireless communication shared key storage region when the wireless communication apparatus participates in a wireless communication network.

5. The wireless communication apparatus according to claim 1, wherein the bus communication shared key is stored in the first bus communication shared key storage region when the wireless communication apparatus is manufactured.

6. The wireless communication apparatus according to claim 1, wherein the wireless communication shared key storage region and the first bus communication shared key storage region are realized by non-volatile memories such as flash memories.

7. The wireless communication apparatus according to claim 1, wherein the first memory is a non-volatile memory such as a flash memory.

8. The wireless communication apparatus according to claim 1, wherein the operation mode of the wireless communication module comprises:
  a secure mode that is set in a normal operation of the wireless communication apparatus after shipment of the wireless communication apparatus; and
  a debug mode that is set to inspect and analyze an operation state of the wireless communication module when the wireless communication apparatus is maintained.

9. The wireless communication apparatus according to claim 1, wherein the second bus communication sub-module controls serial communication in conformity with an asynchronous scheme.

10. The wireless communication apparatus according to claim 1, wherein the private key is stored in the private key storage region and the bus communication shared key is stored in the second bus communication shared key storage region when the wireless communication apparatus is manufactured.

11. The wireless communication apparatus according to claim 1, wherein the private key storage region and the second bus communication shared key storage region are realized by non-volatile memories such as flash memories.

12. The wireless communication apparatus according to claim 1, wherein the second memory is a non-volatile memory such as a flash memory.

13. The wireless communication apparatus according to claim 8, wherein
  the operation mode of the public key encryption processing module comprises the secure mode and the debug mode, and
  the operation modes of the wireless communication module and the public key encryption processing module can be individually changed when a worker gives an instruction to the wireless communication module and the public key encryption processing module.

* * * * *